US012052258B2

(12) United States Patent
Stubblefield

(10) Patent No.: US 12,052,258 B2
(45) Date of Patent: *Jul. 30, 2024

(54) VERIFYING SUBSCRIBER INFORMATION FOR DEVICE-BASED AUTHENTICATION

(71) Applicant: Telesign Corporation, Marina del Rey, CA (US)

(72) Inventor: Stacy Lyn Stubblefield, Los Angeles, CA (US)

(73) Assignee: Telesign Corporation, Marina del Ray, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,022

(22) Filed: Oct. 18, 2022

(65) Prior Publication Data

US 2023/0045525 A1 Feb. 9, 2023

Related U.S. Application Data

(63) Continuation of application No. 16/518,744, filed on Jul. 22, 2019, now Pat. No. 11,509,660.

(51) Int. Cl.

| | |
|---|---|
| ***H04L 9/40*** | (2022.01) |
| ***H04M 7/00*** | (2006.01) |
| ***H04W 8/18*** | (2009.01) |
| ***H04W 12/06*** | (2021.01) |
| ***H04W 12/08*** | (2021.01) |
| ***H04W 60/04*** | (2009.01) |

(52) U.S. Cl.

CPC .......... *H04L 63/102* (2013.01); *H04L 63/083* (2013.01); *H04L 63/0876* (2013.01); *H04M 7/0075* (2013.01); *H04M 7/0078* (2013.01); *H04W 8/18* (2013.01); *H04W 12/06* (2013.01); *H04W 12/08* (2013.01); *H04W 60/04* (2013.01)

(58) Field of Classification Search

CPC . H04L 63/102; H04L 63/083; H04L 63/0876; H04M 7/0075; H04M 7/0078; H04W 8/18; H04W 8/24; H04W 12/06; H04W 12/08; H04W 12/71; H04W 12/72

See application file for complete search history.

(56) References Cited

U.S. PATENT DOCUMENTS 8,151,328 B1 * 4/2012 Lundy .................. H04L 63/083 726/5

2007/0032232 A1 * 2/2007 Bleckert .............. H04L 63/101 455/433

(Continued)

*Primary Examiner* — Khoi V Le

(74) *Attorney, Agent, or Firm* — Perkins Coie LLP

(57) ABSTRACT

A subscriber information authentication system that compares network-obtained and device-obtained information to verify that a device being used in connection with a user account is authenticated for that account. Certain subscriber information may be associated with the account during a registration process. In subsequent attempts to access the account, the registered subscriber information may be used in conjunction with information obtained from a telecommunication network and from a device to verify that the device is authorized. The information from the telecommunication network may be queried using Signaling System No. 7 ("SS7") protocols. The device authorization may be performed, for example, to ensure that a device being used for device-based verification is the device a user purports it to be.

18 Claims, 4 Drawing Sheets

(56) References Cited

U.S. PATENT DOCUMENTS

2010/0125894 A1* 5/2010 Yasrebi ............... H04L 12/2818 726/4
2012/0122423 A1* 5/2012 Helmreich ............ H04W 12/40 455/411
2015/0089621 A1* 3/2015 Khalid ................ H04L 63/0807 726/9

* cited by examiner

VERIFYING SUBSCRIBER INFORMATION FOR DEVICE-BASED AUTHENTICATION

CROSS-REFERENCE TO RELATED APPLICATION(S)

This application is a continuation of U.S. patent application Ser. No. 16/518,744, filed on Jul. 22, 2019, entitled "VERIFYING SUBSCRIBER INFORMATION FOR DEVICE-BASED AUTHENTICATION," the disclosure of which is incorporated herein by reference in its entirety for all purposes.

Individuals increasingly maintain user accounts with Internet websites, cloud-based applications, and other online services. In light of the sensitivity of information that is typically associated with these user accounts (e.g., financial records, health records, professional and social network connections, etc.), it is crucial that attempts to access these accounts be properly authenticated (i.e., verifying that one attempting to access an account is who they purport to be).

Online services typically use traditional username and password checks as a first layer of security. To improve account security, online services are increasingly providing or requiring additional layers of security that involve a verification device associated with a user account. For example, a common second layer of security involves the exchange of a one-time code between the online service and the user via the verification device, such as a smartphone. Typically, the code exchange will involve a communication channel different from that used to request access to the online service. For example, a user may attempt to access an online service from a login device that communicates with the online service through the Internet, while portions of the code exchange may be carried out between the online service and verification device through a telecommunication network. To maintain the fidelity of these additional layers of verification device based security, known and trusted identifiers for communicating with verification devices are often maintained by online services in connection with corresponding user accounts. Verified subscriber information, such as a telephone number, may, for example, be associated with a user account during an account registration process.

Unfortunately, various techniques exist for spoofing subscriber identifiers, thereby enabling "man-in-the-middle" attacks that undermine these additional layers of security. For example, a nefarious individual can make it appear that communications between an online service and a device in their possession are instead with a verification device associated with a user account of the online service. It would therefore be desirable to be able to verify subscriber information used to gain access to an online service.

DETAILED DESCRIPTION

Figure 1:
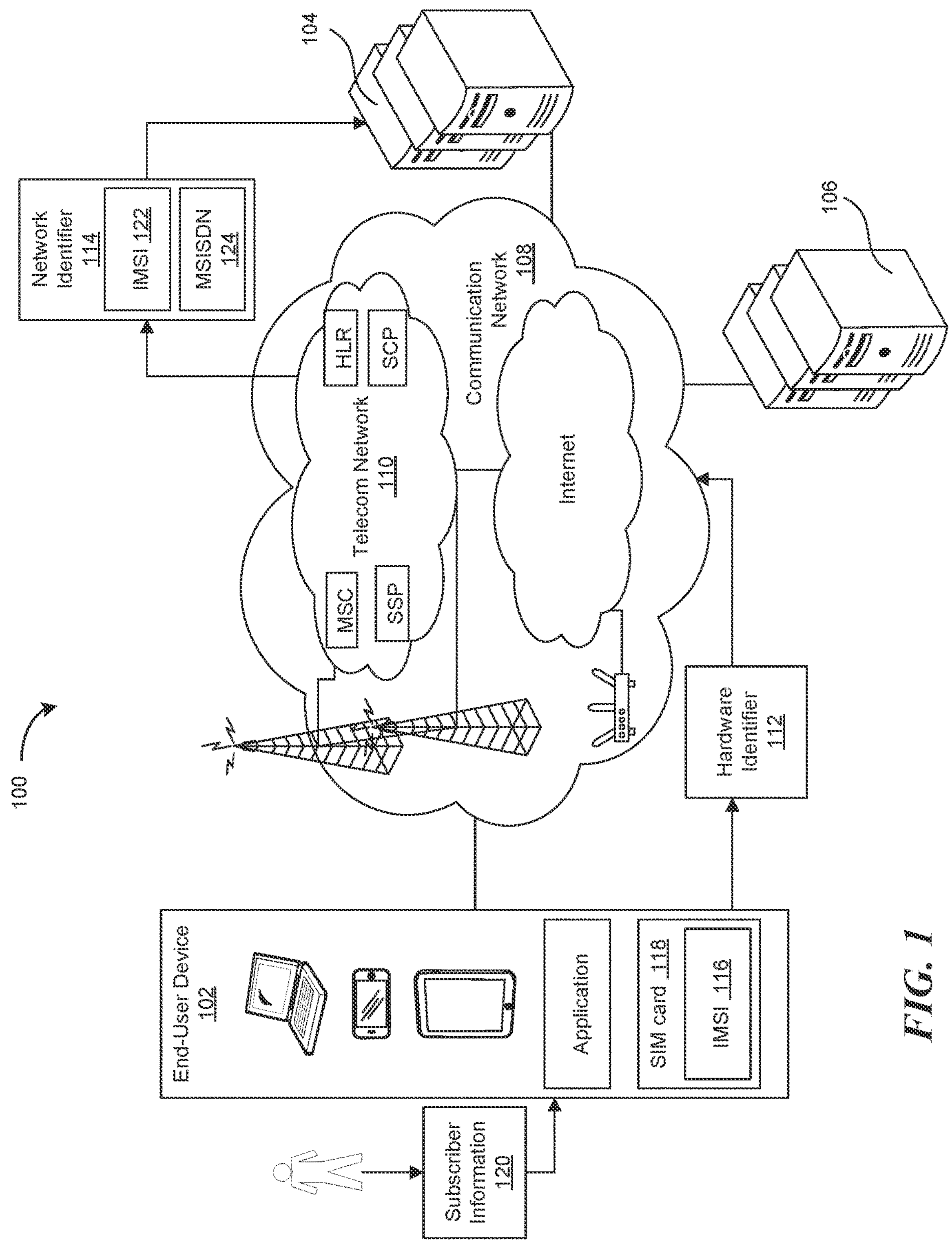
FIG. 1 is a diagram of a representative environment in which a subscriber-information authentication system may operate.

A system and method to authenticate a verification device used to gain access to a user account is described herein. The subscriber-information authentication system uses information provided by a user, information derived from a device being used by the user, information obtained from a communication network to which the user is subscribed, or a combination thereof, to authenticate that the device being used by the user is a trusted verification device associated with the user account.

As described herein, by using certain subscriber information provided by a user to obtain from a communication network a hardware identifier associated with a verification device, and comparing the network-obtained hardware identifier to a comparable identifier derived from the device being used by the user, the system can verify the veracity of the provided subscriber information. Once the authenticated association between the user and the subscriber information has been formed, the system can utilize the authenticated subscriber information to facilitate subsequent accesses to the user account. For example, in some embodiments the system may verify, without user interaction, that a request to access an online service is made from a verification device associated with the authenticated subscriber information for the user account. As a further example, in some embodiments the system verifies that messages received from a device during a code exchange are from the purported verification device. It will be appreciated that the authenticated subscriber information may be used to verify that a device being used is the purported verification device in the context of other device-based verification schemes.

In some embodiments, the subscriber information used by the system to facilitate authentication is a subscriber identifier that identifies a user. The subscriber identifier may be a telephone number or a Mobile Station International Subscriber Directory Number (MSISDN) of a verification device associated with the user. The subscriber information is associated with a user's mobile telecommunication subscription. In some embodiments, the hardware identifier associated with a verification device is an International Mobile Equipment Identity (IMEI) or an International Mobile Subscriber Identity (IMSI) in use or associated with the verification device. Although in some instances an IMSI is stored in a Subscriber Identity Module (SIM) card, and not the device itself, and therefore can be moved between devices, for purposes of the present disclosure an IMSI found in a SIM card may be treated as a hardware identifier, as the SIM card is installed in only one physical device at a time. In some instances the IMSI is part of an Embedded SIM (eSIM) embedded within the verification device. It will be appreciated that other identifiers associated with a specific subscriber (and corresponding telecommunication network subscription) or mobile device may be used.

In various embodiments, the system may use a combination of subscriber information and verification device information to form an authenticated association between a user account and the subscriber information, such as during an account registration process or during an account update process. For example, during an account creation or update process the system may have the user provide, from the device the user intends to "register" as their verification device (e.g., their mobile telephone), the telephone number of that device. The system may also, using a capability provided by the device (e.g., using an API provided by the device operating system), obtain the IMSI of the device. The device-obtained IMSI may be stored on the SIM card installed in the device or stored in a separate storage area of the device (e.g., an eSIM). Using the user-provided telephone number, the system queries a communication network (e.g., the telecommunication network to which the user subscribes) to derive the IMSI that the communication network has associated with the queried telephone number. If the device-obtained and the network-derived IMSIs match, the system regards the user-provided telephone number as being authenticated (i.e., the user provided the true telephone number from the device) and associates the telephone number with the created user account. As described herein, the system uses the authenticated telephone number to facilitate subsequent account accesses.

In some embodiments, the system can identify the authenticated phone number of the intended verification device without user interaction during an account creation or update process. For example, the system can obtain an IMSI from the user's device and use it to acquire a corresponding network-provided identifier (e.g., the MSISDN) from a telecommunication network. The system can then associate the network-provided identifier with the user's account.

Furthermore, subsequent to association of the network-provided identifier with the user's account, the system can utilize the authenticated subscriber information to facilitate or enhance device-based verification performed prior to granting a user permission to access an account. When a user uses a device to attempt to access an account of an online service, the system obtains the IMSI from the device used. The system also identifies the authenticated subscriber information, such as a telephone number, previously associated with the account for which access is sought. In some embodiments, the system uses the device-obtained IMSI to query the telecommunication network and determine the telephone number associated with the IMSI; if the telephone number determined based on the network query matches the telephone number previously associated with the account, the device used in connection with the access attempt is authenticated. In some embodiments, the system uses the previously associated telephone number to query the telecommunication network and determine the IMSI associated with the authenticated telephone number; if the IMSI, determined based on the network query, matches the IMSI obtained from the device, the device used in connection with the access attempt is authenticated. In some embodiments, authenticating the device, based on a device-obtained IMSI and a previously associated authenticated telephone number, constitutes the entirety of a device-based verification used to authenticate a user attempting to access a user account. In some embodiments, authenticating the device as described is used in combination with other approaches for device-based verification (e.g., code exchange or other forms of mufti-factor authentication that utilize a verification device). An advantage of some of the embodiments described is that security associated with accessing an account is enhanced (since a device must be authenticated to complete device-based verification) without requiring further user interaction, thereby avoiding user interruption, reducing the likelihood of errors caused by user typos in the entry of authentication passwords or codes, etc.

In some embodiments, the use of authenticated subscriber information enables the verification of a device during account access, even if the user has changed devices since the account was created. For example, if a user obtains a new device but keeps their telephone number, the IMSI obtained from the new device will match the IMSI determined from a network query of the retained telephone number; therefore, as described above, the device will still be authenticated regardless of the user's change in device. It will be appreciated that the system provides such device-agnostic verification even if the user also obtains a new SIM card with a different IMSI.

In some embodiments, the system obtains information associated with the user's device (e.g., a network-derived IMSI, a network-derived telephone number, a network-derived MSISDN, or other form of identifier) from a telecommunication network by querying the telecommunication network using Signaling System No. 7 ("SS7") protocols. The system may obtain the device information by querying the network for routing information associated with a subscriber, for status information associated with a subscriber, for location information associated with a subscriber, etc. For example, the system may use one of the Mobile Application Part ("MAP") protocol requests SendRoutingInformation ("SRI"), SRI-SM, SEND-IMSI, or "Restore Data" in order to obtain information associated with the user's device.

Various implementations of the system will now be described. The following description provides specific details for a thorough understanding and an enabling description of these implementations. One skilled in the art will understand, however, that the system may be practiced without many of these details or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

Suitable Environments

FIG. 1 and the following discussion provide a brief, general description of a suitable environment in which a subscriber-information authentication system may be implemented. Although not required, aspects of the system are described in the general context of computer-executable instructions, such as routines executed by a general-purpose computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions may reside on a client computer.

FIG. 1 illustrates an example environment 100 in which a subscriber-information authentication system operates. The environment 100 may include one or more end-user devices 102, which may be used by a user to access an authentication server 104 and one or more third-party server computers 106. Aspects of the subscriber-information authentication system may be practiced by the end-user devices 102, the authentication server 104, and the third-party server computers 106.

The subscriber-information authentication system assists with the identification and authentication of a user who is utilizing an end-user device 102 to access websites, applications, or other network-accessible services provided by the third-party server computers 106. For example, a user may attempt to access a network-accessible service with an end-user device 102 used as a "login device," and the system may authenticate the user request based on, in part, verification of an end-user device 102 used as a "verification device." The login device and verification device may be the same or different end-user device 102. For example, in some embodiments the user uses a laptop computer as a login device and a mobile communication device (e.g., a smartphone) as a verification device. In some embodiments the user uses the same mobile communication device as the login device and the verification device.

As will be described in more detail herein, as part of an authentication process, the system verifies that an end-user device 102 being used as part of a verification process (i.e., the "verification device") is properly associated with a user account. To do so, the system obtains a hardware identifier 112 from the end-user device 102. For example, the hardware identifier 112 can be the IMSI 116 of the end-user device 102, which may be stored on the end-user device or on a SIM card 118 installed in the end-user device 102. The hardware identifier 112 can also be the IMEI of the end-user device 102. The end-user device 102 may provide the hardware identifier 112 in response to a command or request received from the authentication server 104 or an application running on the end-user device. The end-user device 102 may also provide, to the authentication server 104, subscriber information 120 (e.g., a telephone number) provided by the user. The user may provide the subscriber information 120 using an interface to the end-user device 102 such as a touchscreen, a keyboard, etc. The system additionally obtains one or more identifiers 114, used by a telecommunication network 110 to assist in identifying the end-user device 102, from the telecommunication network based on the subscriber information 120 or the hardware identifier 112. For example, the network identifiers 114 may be a network-derived IMSI 122 or a network-derived telephone number or MSISDN 124. The network identifiers 114 may be determined based on, for example, querying the Home Location Register (HLR) of the telecommunication network 110. In some embodiments, network identifiers 114 are derived based on information (e.g., subscriber information 120 and IMSI 116) previously obtained by the system (e.g., during a prior registration process) and maintained by the system. As described herein, by comparing network identifiers 114 to comparable identifiers (e.g., subscriber information 120 or IMSI 116) either provided by the end-user device 102 or maintained by the system in association with a user account, the system is able to verify that the end-user device 102 used in connection with user account access is an authorized device for the account. Verifying that account access is truthfully coming from a device authorized to access the user account can be used as a layer of a mufti-layered authentication scheme, used in conjunction, for example, with username and password checks, one-time or limited-time passcode or code exchange, or other techniques that provide Mufti-Factor Authentication (MFA).

The end-user devices 102, authentication server 104, and third-party server computers 106 communicate with each other through one or more public or private, wired or wireless communication networks 108, including, for example, the Internet and telecommunication network 110. The end-user devices 102 communicate wirelessly with a base station or access point using a wireless mobile telephone standard, such as the Global System for Mobile Communications (GSM), Long Term Evolution (LTE), IEEE 802.11 (Wi-Fi), or another wireless standard, and the base station or access point communicates with authentication server 104 and third-party server computers 106. The end-user devices 102 additionally communicate wirelessly with the communication network 108, for example, nearby cell towers or base stations using wireless mobile telephone standards, such as Global System for Mobile Communications (GSM), CDMA (Code Division Multiple Access), General Packet Radio Service (CPRS), and the like. The telecommunication network 110 may support and be operated using SS7 protocols and procedures. The communication network 108 and telecommunication network 110 may be interconnected such that, for example, an end-user device 102 connected to the telecommunication network 110 can communicate via the communication network 108 with authentication server 104, third-party server computers 106, and other devices connected to the network. The end-user device 102 utilizes applications or other software, which operate through the use of computer executable instructions. Some such applications may be directed toward the user authentication process (e.g., receiving a one-time code from the system and providing it to a user). As will be described in more detail herein, the authentication system residing at least in part on the authentication server 104 may also utilize software which operates through the use of computer-executable instructions as part of the authentication process.

Suitable System

Figure 2:
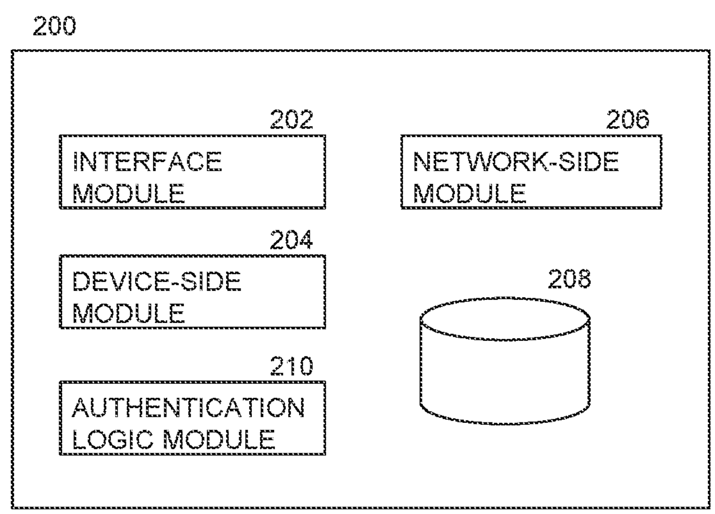
FIG. 2 is a block diagram illustrating a subscriber-information authentication system.

FIG. 2 is a block diagram illustrating a subscriber-information authentication system 200. Aspects of the system may be practiced on computing devices operated by end-users, computing devices operated by authentication service providers, computing devices operated by third parties (e.g., entities or services utilizing or requiring the authentication service), or a combination thereof.

An interface module 202 generates graphical user interfaces (GUIs) to allow users to access the subscriber-information authentication system 200. For example, the interface module 202 generates a GUI that displays prompts or requests to a user in order to obtain subscriber information from the user. The interface module 202 also provides application programming interfaces (APIs) to enable communication and interfacing with the system 200. APIs may be utilized by other applications, web portals, or distributed system components to use the system. For example, APIs provided by the interface module 202 may be used to integrate with a third-party service provider that implements or facilitates authentication services or services available to the user after authentication, including the data or the functions accessible subsequent to authentication of a user. The user of an end-user device may use an API to interface with system servers and access data or functionalities from the devices operated by third parties. The API may utilize, for example, Representational State Transfer (REST) architecture and Simple Object Access Protocols (SOAPS).

A device-side module 204 interacts with end-user devices for determining certain device-obtained information. The device-side module 204 can, for example, interact directly with the end-user device via calls or requests to the device. The device-side module 204 can include one or more network adapters or communication circuitry, one or more processors, associated configurations or APIs, or a combination thereof for communicating with end-user devices. The device-side module 204 can, for example, obtain from an end-user device the device's IMSI or certain corresponding subscriber information, such as the telephone number or MSISDN associated with the device. The device-side module 204 can also obtain said information from a user through the interface module 202. The device-side module 204 can also provide said information to other devices, such as authentication servers or third-party computing devices used by the system.

A network-side module 206 interacts with a telecommunication network to determine information, such as device or subscriber identifiers, from the telecommunication network. The network-side module 206 can communicate with and retrieve information from the telecommunication network through various SS7 protocols. For example, the network-side module 206 can use SS7 commands to query components of the telecommunication network, such as a HLR, to obtain the IMSI or telephone number associated with an end-user device. The network-side module 206 can include one or more network adapters or communication circuitry, one or more processors, associated configurations or API, or a combination thereof.

An authentication logic module 210 processes information received via the interface module 202, the device-side module 204, or the network-side module 206 in order to authenticate the user's device as described herein. The authentication logic module 210 coordinates appropriate calls and sequencing of requests by each of the other modules as necessary to either verify a user's device or not verify the user's device for failure to pass one or more of the confirmatory checks set forth herein.

The interface module 202, the device-side module 204, the network-side module 206, and the authentication logic module 210 can access user information or device information in storage areas 208. The accessed data may be stored in any readily accessible format, including data maintained by a database management system (e.g., MYSQL, Microsoft SQL Server, Oracle, MongoDB), or in any relational, non-relational, object, or objection-relational database.

Flows for a Subscriber-Information Authentication System

Figures 3, 4:
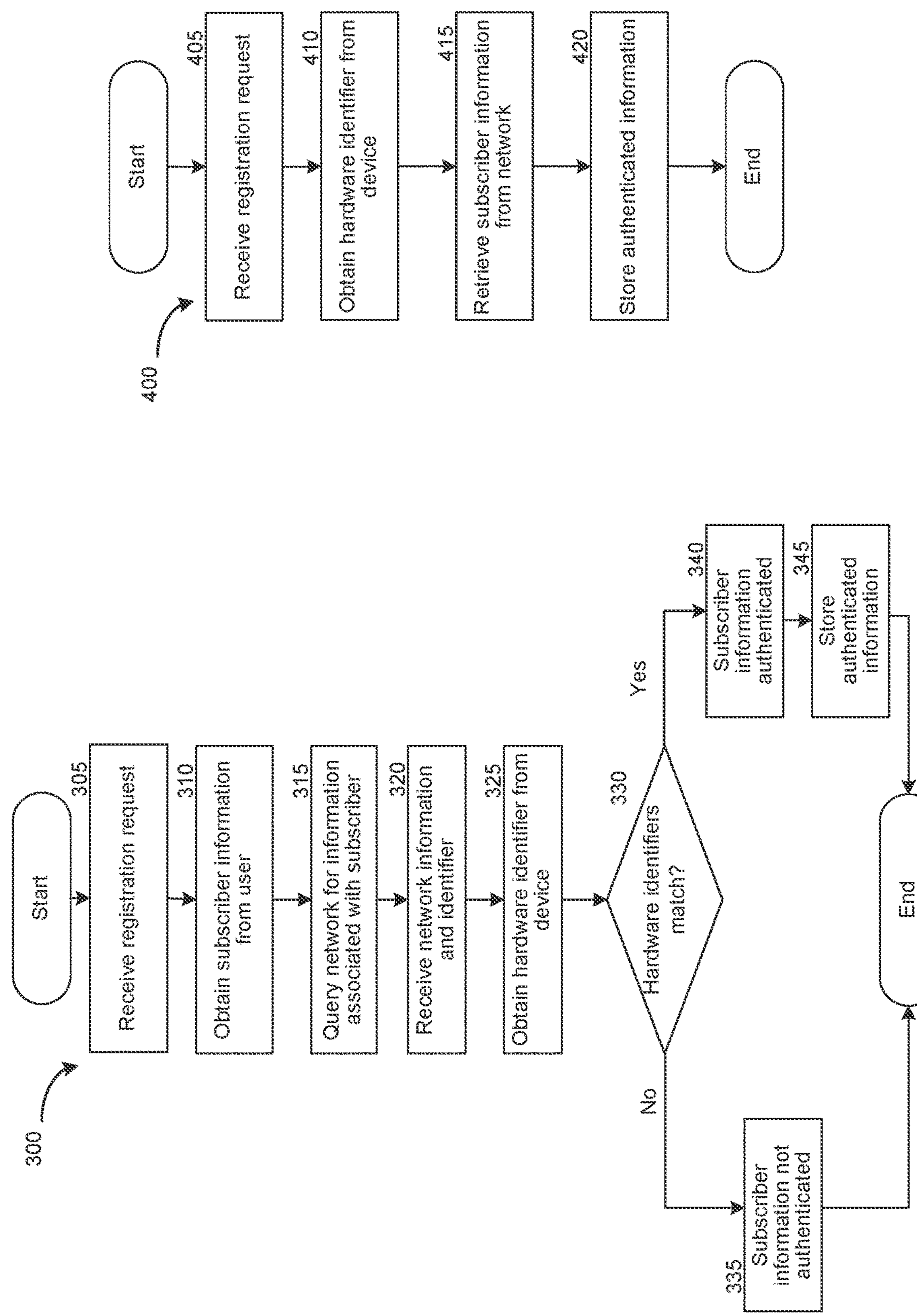
FIGS. 3 and 4 are flow diagrams illustrating processes implemented by the subscriber-information authentication system for registering information describing a subscriber or device with an account.

FIGS. 3 and 4 are flow diagrams illustrating example processes 300 and 400, respectively, implemented by a subscriber-information authentication system, for obtaining or verifying certain subscriber information (such as a telephone number) associated with an end-user device. As described herein, FIG. 3 illustrates generally a process in which subscriber information provided by a user is compared against information derived from a telecommunication network, thereby verifying the user-provided information. As described herein, FIG. 4 illustrates generally a process in which subscriber information is derived from a telecommunication network based on one or more identifiers obtained directly from an end-user device, and is therefore considered verified. By verifying certain subscriber information, such as a telephone number, that information may be "registered" or associated with a user account, and may be used to facilitate subsequent authentication during attempts to access the user account. The processes 300 and 400 can occur, for example, when the user account is first created or during a later stage of account registration.

Referring to FIG. 3, the process 300 begins at block 305, where the system receives a request to register certain subscriber information with a user account. The request may be received, for example, as part of an account creation process or after the account has already been created.

At a block 310, the system obtains subscriber information from a user. For example, as part of a registration step, the user may be prompted by the system to enter a phone number associated with a verification device that the user intends to register. The prompt may be displayed on the verification device or some other computing device being used by the user. The user may provide the requested subscriber information to the system via the verification device or another computing device.

At a block 315, the system queries a telecommunication network for the network's information associated with the user-provided subscriber information. The system can, for example, query the telecommunication network to which the verification device is a subscriber. The system can also query other telecommunication networks of which the verification device is not a subscriber. For example, certain telecommunication networks share subscriber and device information with each other, which the system can query. The system can perform the query using an SRI request, an SRI-SM request, or other request for routing or status information from the network. It will be appreciated that other MAP requests or SS7 protocols may be used to obtain identifier information from the network.

At a block 320, the system receives information from the telecommunication network associated with the queried subscriber information. The received network information indicates the location of the corresponding subscriber, availability, and other routing information. The network information additionally includes an identifier corresponding to the device currently associated with the provided subscriber information, which may be used by the telecommunication network to facilitate management of and communication with the device. One example of a hardware identifier used by the network to facilitate management of a device is the HSI of the device, though other identifies associated with a device can be used. If available, the received information could therefore include the IMSI associated with the device presently corresponding to a queried telephone number. The network-derived IMSI may be determined, for example, based on the telecommunication network performing a query of its HLR based on provided subscriber information.

At a block 325, the system obtains a hardware identifier from the verification device that the user intends to register. For example, the system may obtain the IMSI from the device. In order to provide its IMSI to the system, the device obtains its IMSI in response to an application or operating system request. For example, a device running on the Android operating system may return its IMSI in response to a getSubscriberId( ) function call. In response, the device provides the IMSI for the SIM card installed in the device. It will be appreciated however that other techniques exist, both on Android and other operating systems used by devices, to obtain the IMSI of the device as well as other identifiers that uniquely identify the device or installed SIM card.

At a decision block 330, the system determines whether a hardware identifier obtained from the device and a hardware identifier received from the telecommunication network match. For example, the system may compare the device IMSIs obtained as described in connection with blocks 320 and 325. If the two hardware identifiers match, processing continues to a block 340. If the two hardware identifiers do not match, processing continues to block 335.

If at decision block 330 it was determined that the two hardware identifiers do not match, then at block 335 the system identifies that the subscriber information provided by the user has not been authenticated. That is, according to the telecommunication network, the device corresponding to the provided user information is different from the device the user intends to register as a verification device for a user account. When that occurs, the subscriber information or hardware identifier is not registered with the user account. In some embodiments the process may end. In some embodiments the process may request subscriber information again from the user (in case the user incorrectly entered the information), for example by returning to block 310. The process then terminates.

If at decision block 330 it was determined that the two hardware identifiers match, then at block 340 the provided subscriber information is authenticated. That is, according to the telecommunication network, the device corresponding to the provided user information is the same as the device the user intends to register as a verification device for a user account. In other words, the provided subscriber information can be treated as authenticated for association with a user account.

At a block 345, authenticated information is stored in association with a user account. For example, a user may be creating a new account with a third-party service, and the authenticated information may have been identified and verified in connection with an account registration or creation process. The system stores the authenticated subscriber information, such as a telephone number or MSISDN, or authenticated hardware identifier, such as an IMSI or IMEI, or a combination thereof, in association with the user's account. As described herein, the stored authenticated information can be used to facilitate subsequent verification of a device in connection with a later account access. The process then terminates.

Referring to FIG. 4, process 400 illustrates an additional example process that can be executed by the subscriber-information authentication system to obtain verified subscriber information associated with an end-user device. The process begins at a block 405, where the system receives a request to register certain subscriber information with a user account. The request may be received, for example, as part of an account creation process or after the account has already been created.

At a block 410, the system obtains a hardware identifier from a verification device that the user intends to register for the account. For example, the system may obtain the IMSI from the device. The device may obtain its IMSI, to be provided to the system, in response to an application or operating system request. For example, a device running on the Android operating system may return its IMSI in response to a getSubscriberId( ) function cell. In response, the device provides the IMSI for the SIM card installed in the device. It will be appreciated however that other techniques exist, both on Android and other operating systems used by devices, to obtain the IMSI of the device as well as other identifiers that uniquely identify the device or installed SIM card.

At a block 415, the system retrieves subscriber information from a telecommunication network based on the obtained hardware identifier. For example, the system can query the telecommunication network to which the device is subscribed, or another telecommunication network that shared information with the subscriber network, to retrieve subscriber information corresponding to the obtained IMSI using the "Restore Data" command. Retrieved subscriber information may include the telephone number or MSISDN corresponding to the queried IMSI. It will be appreciated, however, that other SS7 commands or requests may be used to obtain information from a telecommunication network regarding the subscriber associated with a particular hardware identifier.

At a block 420, authenticated information is stored in association with a user account. For example, a user may be creating a new account with a third-party service or updating an existing account, and the authenticated information may have been identified and verified in connection with an account creation or update process. The system stores the authenticated subscriber information, such as a telephone number or MSISDN, in association with the user's account. As a further example, the system can store an authenticated hardware identifier, such as an IMSI or IMEI of the requesting device, in association with the user's account. As described herein, the stored authenticated information can be used to facilitate subsequent verification of a device in connection with a later account access. The process then terminates.

Figure 6:
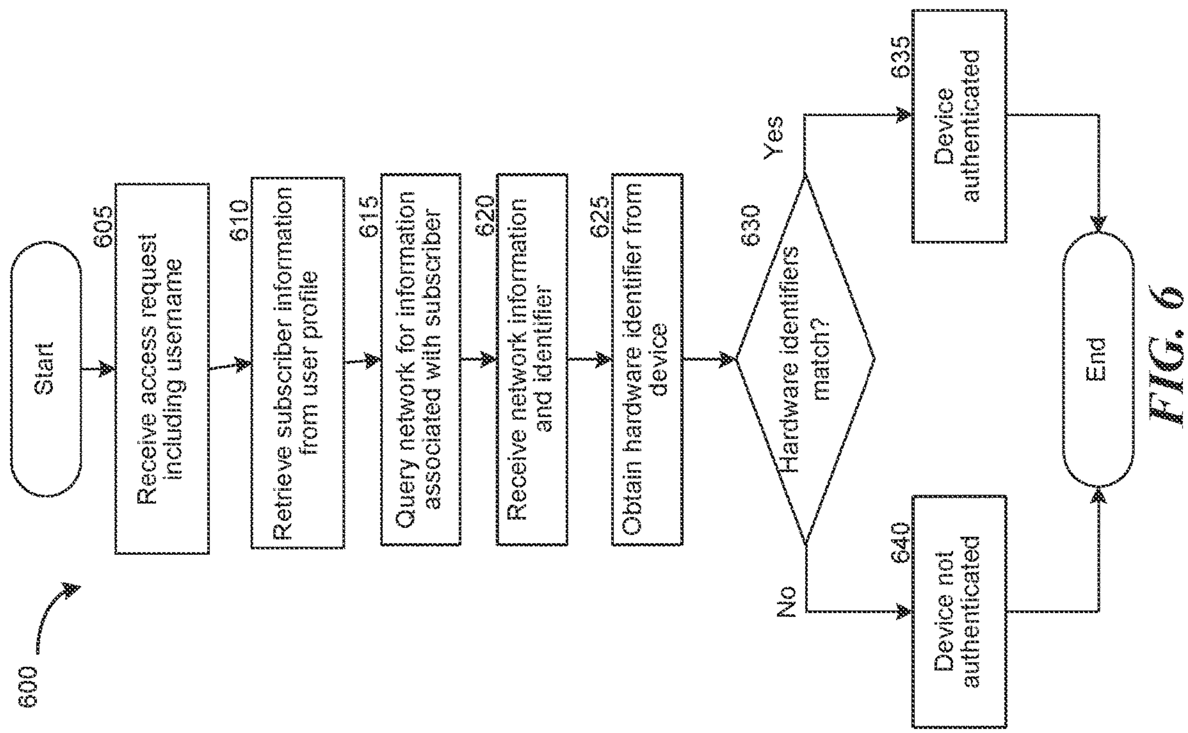
FIGS. 5 and 6 are flow diagrams illustrating processes implemented by the subscriber-information authentication system for verifying a device used in part to access an account based on information registered with the account.
Figure 5:
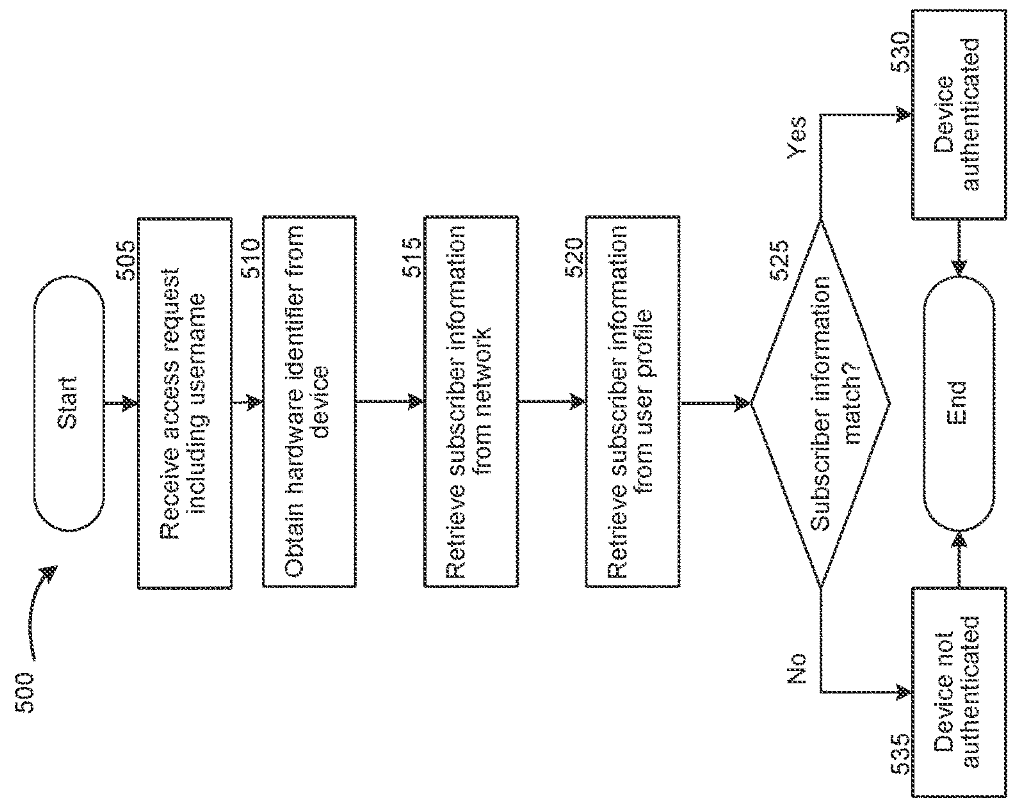

FIGS. 5 and 6 are flow diagrams illustrating example processes 500 and 600, respectively, implemented by a subscriber-information authentication system, for verifying that device information is consistent with previously-identified device information. The processes 500 and 600 may be used, for example, to verify that a device being used in connection with accessing a previously-registered account is permitted. As described herein, both processes 500 and 600 utilize certain information already associated with the account (from, for example, a prior registration process) as well as certain information obtained from the device at the time of attempted account access; the processes differ, for example, in how the information is used to verify the device.

Referring to FIG. 5, process 500 begins at a block 505, where the system receives an individual request to access an online service. The request may include information identifying a user account previously registered with the service (e.g., a username), which is associated with a user profile maintained by the system.

At a block 510, the system obtains a hardware identifier from a device that the user intends to use as a verification device for accessing the account. The verification device may be the device from which the user attempts to access the account. Alternatively, the verification device may be different from the device used to access the account, but may be utilized for further device-based verification prior to account access. At block 510, the system may, for example, obtain the IMSI from the device. The device may obtain its IMSI in response to an application or operating system request. For example, a device running on the Android operating system may return its IMSI in response to a getSubscriberId( ) function call. In response, the device provides the IMSI for the SIM card installed in the device. It will be appreciated however that other techniques exist, both on Android and other operating systems used by devices, to obtain the IMSI of the device as well as other identifiers that uniquely identify the device or installed SIM card.

At a block 515, the system retrieves subscriber information from a telecommunication network, such as the telecommunication network to which the device is subscribed or a telecommunication network that shares data with the subscriber network, based on the obtained hardware identifier. For example, the system can query the telecommunication network to retrieve subscriber information corresponding to the obtained IMSI using the "Restore Data" command. Retrieved subscriber information may include the telephone number or MSISDN corresponding to the queried IMSI. It will be appreciated, however, that other SS7 commands or requests may be used to obtain information from a telecommunication network regarding the subscriber associated with a particular hardware identifier.

At a block 520, the system retrieves subscriber information from the user profile maintained by the system. In connection with the user profile, the system maintains known subscriber information for the user account, such as may have been generated during a prior registration or creation process (such as those illustrated in FIGS. 3 and 4). The maintained subscriber information may include, for example, a telephone number or MSISDN that has been verified as being associated with the account.

At a decision block 525, the system determines whether subscriber information retrieved from the user profile and subscriber information retrieved from the network (based on the hardware identifier obtained from the device) match. For example, the system may compare the stored and received telephone numbers or the stored and received MSISDNs. If the subscriber information matches, processing continues to a block 530. If the subscriber information does not match, processing continues to a block 535.

If at the decision block 525 it was determined that the profile-retrieved and network-retrieved subscriber information matches, then at block 530 the system identifies that the verification device used in connection with account access has been authenticated. That is, the device is provisioned, according to the telecommunication network, to the subscriber information (e.g., telephone number) that was previously registered for accessing the user account. Accordingly, the device is authenticated, and access to the user account may proceed. An authorization indication that the device has been authenticated may be transmitted by the system to, for example, the third-party service corresponding to the account the user wishes to access. In some embodiments the device authentication is used in combination with traditional account verification steps (e.g., a username and password check), as well as device-based verification steps (e.g., code exchange using the device), in order to gain access to the account or services associated with the account; the exemplary additional verification steps may be conducted prior, after, or in parallel with the illustrated process 500. The process then terminates.

If at the decision block 525 it was determined that the profile-retrieved and network-retrieved subscriber information does not match, then at block 535 the system designates the device being used in connection with attempted account access to not be authenticated. That is, the device is not provisioned to the subscriber information (e.g., telephone number) previously registered for accessing the user account. An indication that the device has not been authenticated may be transmitted by the system to, for example, the third-party service corresponding to the account the user wishes to access. In some embodiments, the attempt to access the user account may be denied in response to the indication. In some embodiments, the system, such as a third-party computing device or the authentication server, could require additional or alternative verification checks prior to granting the user access. The process then terminates.

Referring to FIG. 6, the process 600 illustrates an additional example process implemented by a subscriber-information authentication system for verifying a device used in connection with accessing a user account. The process begins at a block 605, where the system receives an individual request to access an online service. The request may include information identifying a user account previously registered with the service (e.g., a username), which is associated with a user profile maintained by the system.

At a block 610, the system retrieves subscriber information from the user profile maintained by the system. In connection with the user profile, the system maintains known subscriber information for the user account, such as may have been generated during a prior registration or creation process (such as those illustrated in FIGS. 3 and 4). The maintained subscriber information may include, for example, a telephone number or MSISDN that has been verified as being associated with the account.

At a block 615, the system queries a telecommunication network for the network's information associated with subscriber information maintained in the user profile. The system may query the telecommunication network corresponding to the service subscription associated with the subscriber information, or another telecommunication network that shares data with the subscriber network. For example, the system may query the network for information associated with a telephone number by sending an SRI request, an SRI-SM request, or other request for routing or status information from the network. It will be appreciated that other MAP requests or SS7 protocols may be used to obtain identifier information from the network.

At a block 620, the system receives information from the telecommunication network associated with the queried subscriber information. The received network information indicates the location of the corresponding subscriber, availability, and other routing information. The network information additionally includes an identifier corresponding to the device currently associated with the provided subscriber information, which may be used by the telecommunication network to facilitate management of and communication with the device. For example, the received information may include the IMSI associated with the device presently corresponding to a queried telephone number. The network-derived IMSI may be determined, for example, based on the telecommunication network performing a query of its HLR based on provided subscriber information.

At a block 625, the system obtains a hardware identifier from the verification device used to verify the user's request to access the user account. For example, the system may obtain the IMSI or IMEI from the device. The device may obtain its IMSI in response to an application or operating system request. For example, a device running on the Android operating system may return its IMSI in response to a getSubscriberId( ) function call. In response, the device provides the IMSI for the SIM card installed in the device. It will be appreciated however that other techniques exist, both on Android and other operating systems used by devices, to obtain the IMSI of the device as well as other identifiers that uniquely identify the device or installed SIM card.

At a decision block 630, the system determines whether a hardware identifier obtained from the device and a hardware identifier received from the telecommunication network match. For example, the system may compare the device IMSIs obtained as described in connection with blocks 620 and 625. If the two hardware identifiers match, processing continues to a block 635. If the two hardware identifiers do not match, processing continues to block 640.

If at decision block 630 it was determined that the device-retrieved and network-retrieved hardware identifier matches, then at block 635 the system identifies that the verification device used in connection with account access has been authenticated. That is, the telecommunication network's notion of what device is provisioned to the subscriber information (e.g., the subscriber's telephone number) that was previously registered is the same as the device being used to request access. Accordingly, the device is authenticated, and access to the user account or to services associated with the user account may proceed. An authorization indication that the device has been authenticated may be transmitted by the system to, for example, the third-party service the user wishes to access corresponding to the user account. In some embodiments the device authentication is used in combination with traditional account verification steps (e.g., a username and password check), as well as device-based verification steps (e.g., code exchange using the device), in order to gain access to the account; the exemplary additional verification steps may be conducted prior, after, or in parallel with the illustrated process 600. The process then terminates.

If at the decision block 630 it was determined that the device-retrieved and network-retrieved hardware identifiers do not match, then at block 640 the system designates the device being used in connection with attempted account access to not be authenticated. That is, the device being used to facilitate access to the account is not the one the telecommunication network believes is provisioned to the subscriber information (e.g., telephone number) previously registered for accessing the user account. An indication that the device has not been authenticated may be transmitted to, for example, the third-party service corresponding to the account the user wishes to access. In some embodiments the attempt to access the user account may be denied in response to the indication. In some embodiments the system, such as a third-party computing device or the authentication server, could require additional or alternative verification checks prior to granting the user access. The process then terminates.

It will be appreciated that example authentication processes 500 and 600 may enable authentication of a verification device even when the verification device changes subsequent to account creation. If after registering an account a user obtains a new device or SIM card, it is understood that certain hardware identifiers will change. For example, a new SIM card may be provisioned with a new IMSI, while a new device will be associated with a new IMEI. If the user retains their telephone number, the network information will in time update to reflect the fact that the retained telephone number has been provisioned to a new device or SIM, with corresponding new hardware identifier. Therefore, when the user later attempts to access an account with the new device, the network-retrieved hardware identifier (e.g., IMSI or IMEI) will match that retrieved from the new device. Accordingly, the new device will continue to be authenticated per the illustrated processes.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

I claim:

1. A computer-implemented method of performing a device verification check in response to a user request to access a network-accessible service, the method comprising:

receiving a request to access a network-accessible service by a user, the user associated with a user profile of the network-accessible service, wherein the user profile of the network-accessible service comprises a subscriber identifier for a mobile telecommunication subscription, and wherein the mobile telecommunication subscription is distinct from the network-accessible service;

obtaining, from the user profile, the subscriber identifier;

obtaining, from a mobile communication device associated with the user, a hardware identifier;

transmitting, to a telecommunication network, a query for network-derived information associated with one of the subscriber identifier or the hardware identifier;

receiving, from the telecommunication network, a query response that comprises a network-derived identifier associated by the telecommunication network with the one of the subscriber identifier or the hardware identifier;

comparing the network-derived identifier with the other of the subscriber identifier or the hardware identifier, to detect whether the network-derived identifier and the other of the subscriber identifier or the hardware identifier match;

performing a verification check based on the user request or the user profile; and generating, based on the comparison to detect the match and the verification check, an authorization indication in response to the user request, based on which the network-accessible service can approve or deny the user request.

2. The method of claim 1, the method further comprising receiving a user identifier and a password, and wherein the verification check comprises comparing the user identifier and the password with a user identifier and a password associated with the user profile.

3. The method of claim 1, the method further comprising receiving a one-time passcode, and wherein the verification check comprises comparing the one-time passcode to a passcode generated in response to the user request.

4. The method of claim 1, wherein the subscriber identifier was associated with the user profile during a registration process.

5. The method of claim 1, wherein the subscriber identifier was associated with the user profile by:

receiving a request to associate user subscriber information with the user profile;

obtaining, from a mobile communication device associated with the request to associate user subscriber information was received, a second hardware identifier;

determining, based on querying the telecommunication network, a subscriber identifier associated with the second hardware identifier; and associating the subscriber identifier with the user profile.

6. The method of claim 1, wherein the subscriber identifier was associated with the user profile by:

receiving a request to associate user subscriber information with the user profile, wherein the request comprises a user-provided subscriber identifier;

obtaining, from a mobile communication device associated with the request to associate user subscriber information was received, a device-obtained hardware identifier;

determining, based on querying the telecommunication network, a network-derived hardware identifier based on the user-provided subscriber identifier; and associating, based on a comparison of the device-obtained hardware identifier and the network-derived hardware identifier, the user-provided subscriber identifier with the user profile.

7. The method of claim 1, wherein the subscriber identifier is a telephone number associated with the mobile telecommunication subscription.

8. The method of claim 1, wherein the hardware identifier is associated with the mobile communication device.

9. The method of claim 1, wherein the hardware identifier is an international mobile subscriber identity (IMSI) or an international mobile equipment identity (IMEI).

10. The method of claim 1, wherein the query is for network-derived information associated with the subscriber identifier, and wherein the query is a SendRoutingInformation (SRI) or an SRI-SM request.

11. A computer-implemented method for performing a device verification check in response to a user request to access a network-accessible service, the method comprising:

receiving a request by a user to register with a network-accessible service;

obtaining, from a mobile communication device associated with the registration request of the user, a first identifier;

receiving, from a telecommunication network, a second identifier associated by the telecommunication network with the first identifier;

generating a user profile, associated with the user, for the network-accessible service, the user profile comprising the second identifier;

receiving a request to access the network-accessible service by the user;

obtaining, from a mobile communication associated with the request to access the network-accessible service was received, a third identifier;

receiving, from the telecommunication network, a fourth identifier associated by the telecommunication network with the third identifier;

comparing the second identifier and the fourth identifier, to detect whether the second identifier and the fourth identifier match;

performing a verification check based on the request to access the network-accessible service or the user profile; and generating, based on the comparison to detect the match and the verification check, an authorization indication in response to the request to access the network-accessible service, based on which the network-accessible service can approve or deny the request.

12. The method of claim 11, wherein the request to access the network-accessible service comprises a user identifier and a password, and wherein the verification check comprises comparing the user identifier and the password to a user identifier and a password associated with the user profile.

13. The method of claim 11, the method further comprising receiving a one-time passcode, and wherein the verification check comprises comparing the one-time passcode to a passcode generated in response to the request to access the network-accessible service.

14. The method of claim 11, wherein the first identifier and the third identifier are hardware identifiers associated with mobile communication devices.

15. The method of claim 14, wherein the hardware identifiers are international mobile subscriber identities (IMSIs) or international mobile equipment identifies (IMEIs).

16. The method of claim 11, wherein the second identifier and the fourth identifier are subscriber identifiers associated with a mobile telecommunication subscription.

17. The method of claim 11, wherein the first identifier and the third identifier match.

18. The method of claim 11, wherein the first identifier and the third identifier are different.

* * * * *